United States Patent [19]
Harvey et al.

[11] 3,837,308
[45] Sept. 24, 1974

[54] FLOATING POWER PLANT

[75] Inventors: Douglas G. Harvey, Nashua, N.H.; John F. Holmes, Andover, Mass.

[73] Assignee: Sanders Associates, Inc., Nashua, N.H.

[22] Filed: May 24, 1971

[21] Appl. No.: 146,393

[52] U.S. Cl. ............................................. 114/.5 R
[51] Int. Cl. ........................................... B63b 35/02
[58] Field of Search...... 114/.5 R, 230, 206 R, .5 D; 175/5

[56] References Cited
UNITED STATES PATENTS

| | | | |
|---|---|---|---|
| 2,972,973 | 2/1961 | Thearle | 114/.5 D |
| 3,487,484 | 1/1970 | Holmes | 9/8 R |
| 3,599,589 | 8/1971 | Busey | 114/.5 R |
| 3,659,541 | 5/1972 | Rigg | 114/.5 R |

OTHER PUBLICATIONS

"Add New Problems To Old List," by John L. Kennedy, The Oil and Gas Journal, Vol. 67, No. 19, pp. 162–177, May 12, 1969.

*Primary Examiner*—Duane A. Reger
*Assistant Examiner*—Charles E. Frankfort
*Attorney, Agent, or Firm*—Louis Etlinger; Richard I. Seligman

[57] ABSTRACT

A floating power plant is housed in a generally spherical double-walled shell. The shell and its contents form part of a compound pendulum whose center of mass is located below the metacenter of the sphere and which has a natural frequency substantially below that of the prevailing wave frequency of the water. Consequently, the power plant is supported upright in the water and does not rock in response to the wave motion of the water.

13 Claims, 5 Drawing Figures

PATENTED SEP 24 1974　　SHEET 1 OF 3　　3,837,308

INVENTORS
JOHN F. HOLMES
DOUGLAS G. HARVEY
BY
ATTORNEY

INVENTORS
JOHN F. HOLMES
DOUGLAS G. HARVEY
BY
ATTORNEY

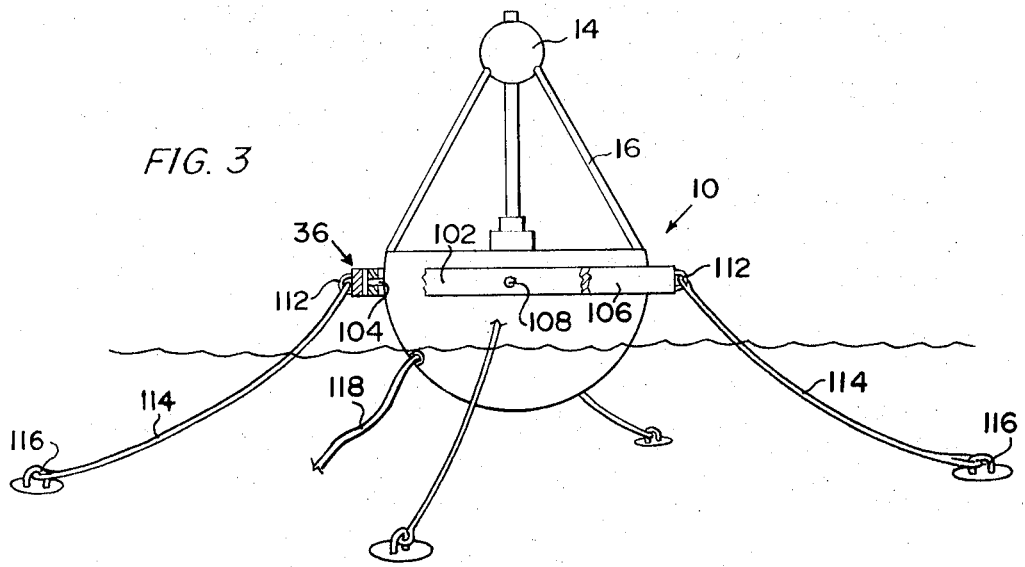
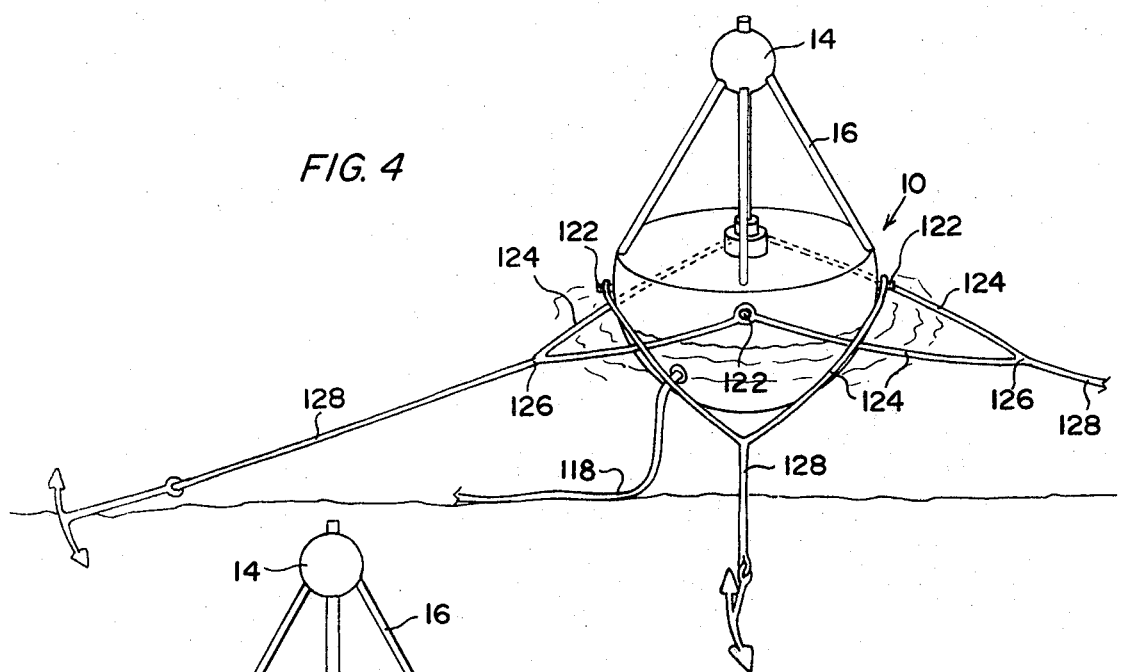
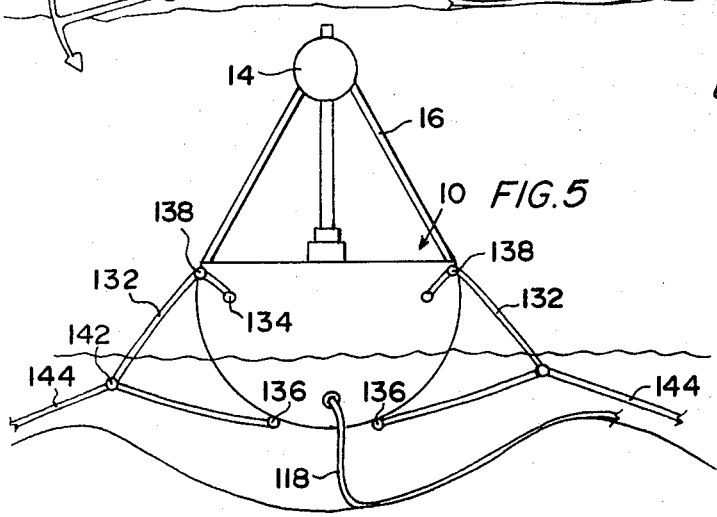

FLOATING POWER PLANT

BACKGROUND OF THE INVENTION

This invention relates to an electrical power plant. It relates more particularly to a power plant which can be situated in off-shore waters.

There is presently a great need to increase the world's sources of electric power. Nuclear power particularly has a tremendous potential for producing electricity relatively safely and efficiently. However, for various reasons the construction of power plants of both nuclear and fossil fuel varieties has not kept up with the increasing demand for such power. The siting of these power plants is a large part of the problem. Because of fears of local air pollution and water pollution, including the thermal variety, people are loath to have power plants near them. In the case of nuclear plants, there is also fear on the part of the public of radioactive discharge and even sudden failure.

Recently, some thought has been given to locating power plants in the ocean where they would be relatively remote from population centers and thus less open to criticism. Moreover, they would have at hand, an unexhaustible supply of water for cooling purposes, a particularly important requirement for efficient operation of nuclear power plants. Following this approach there are three possible types of construction that might be used, to wit: a fixed platform, a submerged enclosure or a floating platform. We are concerned here with the last type of approach because it offers several advantages. It absorbs much less wave energy than a fixed platform and it is much more accessible than a submerged plant.

However, the construction of a floating power plant does present some difficulties. Many of these are traceable to the fact that the conventional floating platforms tend to roll and pitch due to the wave motion of the water in which the platform floats. Since all such platforms are compliant to some extent, the rolling and pitching motions flex the platform enough to bend the various long shafts and rotors employed in conventional power plants. In many cases even a slight bending of these critical elements causes irreparable damage to the plant machinery. Excessive rolling and pitching also makes it more difficult to work aboard the platform. Further, it may result in the breakage or loss of expensive equipment.

There are other attendant difficulties with floating power plants especially those of the nuclear variety. For example, prevailing safety standards require that the nuclear reactor be placed inside a chamber capable of containing moderate sudden pressure increases. Also, steps must be taken to minimize the effects of a collision by a ship. Further, there must be suitable means for securely mooring the platform at the desired location in the ocean.

SUMMARY OF THE INVENTION

Accordingly, this invention aims to provide a self contained floating power plant which is stable.

Another object of the invention is to provide a power plant which is relatively easy to construct and maintain.

A further object of the invention is to provide a floating nuclear power plant having the requisite safeguards normally found in conventional land base plants of this type.

A further object of the invention is to provide a floating nuclear power plant in which the reactor would suffer minimum damage in the event of collision.

Yet another object of the invention is to provide an improved moored floating platform capable of housing a nuclear power plant or the like.

Other objects will in part be obvious and in part will appear hereinafter.

The invention accordingly comprises the features of construction, combination of elements and arrangement of parts which will be exemplified in the construction hereinafter set forth, and the scope of the invention will be indicated in the claims.

In general, the power plant is housed in a spherical "platform" which is mechanically tuned so that it is decoupled from the motion of the ocean waves. This makes the platform unusually stable, despite wave motion. U.S. Pat. No. 3,487,484 sets forth some of the principles of tuned floating bodies. The machinery and equipment associated with the power plant are contained in a generally spherical double-walled housing which floats in the water. Also, a large water tank, preferably also spherical in shape, is spaced above the housing and supported by it. The nuclear reactor and other heavy power plant components are situated in the housing so that the center of mass of the entire system is located below the metacenter of the spherical housing. Consequently, the platform tends to float in the upright condition with the water tank directly above the housing.

Also the housing and water tank and their contents form a compound pendulum whose natural frequency depends on the distance between the tank and housing and the mass distribution within those containers. These factors are chosen so as to give the pendulum a natural frequency well below that of the wave frequencies likely to be encountered even under extremely bad sea conditions, e.g., sea state eight. The platform is thus effectively decoupled from the wave motion and does not pitch or roll. It does move up and down with the waves. However, vertical displacement is well within tolerable limits. For example, under sea state eight conditions, a typical floating power plant of our design 300 feet in diameter and weighing about 85,000 tons might be displaced as little as seven feet on either side of the static water line in heave. Moreover, the acceleration such motion imparts to the platform and its contents is relatively small. Typical acceleration of our plant would be only about 0.28 g at sea state eight and 0.17 g at sea state five. This is well within the design capability of our system using present day construction materials and techniques. Moreover, it is practically unnoticeable to personnel located on the platform.

This same platform, having a natural roll frequency of 40 seconds, rolls less than 2° in sea state eight and less than 0.5° in sea state five. This extreme degree of roll stabilization eliminates gyroscopic loads on the turbine generator bearings, eliminates sloshing of water in the spent fuel storage tanks, and simplifies the mooring problems.

Horizontal movement or translation of the platform in response to wave motion is held to a minimum by means of special mooring systems to be described in more detail later. These mooring systems retain the platform at the selected site without interfering with the physical characteristics noted above which impart pitch and roll stability to the floating plant.

The present system is particularly suitable for a nuclear power plant. Consequently, we will describe the invention in this context. However, it should be understood that the plant might very well be fueled in other ways.

In accordance with conventional landbased nuclear power plant design, for safety reasons, the nuclear reactor itself and the shielding therefor are contained within a pressure chamber capable of containing a sudden pressure increase due to reactor failure or the like. In the present instance, the chamber takes the form of a closed domed reactor compartment at the very bottom of the spherical housing. This compartment is situated so that the circular joint between the domed overhead wall of the compartment and the hull of the spherical housing is situated well below the water line. Thus, if a ship should collide with the platform, it still would likely not penetrate the reactor compartment. Also the volume of the reactor compartment is such that it displaces enough water to support the entire platform. In other words, if for some reason the entire rest of the platform fills with water, the sealed reactor compartment still has sufficient buoyancy to float the entire system.

The heavy reactor components and shielding are distributed within the compartment so that the center of mass lies directly below the metacenter of the spherical housing. The remaining elements of the power plant are located within the housing immediately above the compartment containing the reactor. These elements include, for example, pumps, turbines, generators, condensers, and like equipment. This machinery is also suitably distributed within the housing.

The lighter equipment associated with the power plant such as electrical control panels, switches, etc. is located at still higher levels within the housing. The top most levels in the housing can serve as storage and living quarters for the crew operating and servicing the plant. Also, preferably the housing has a flat main deck area to facilitate loading and off-loading supplies and equipment.

The tank of water is supported directly above the metacenter of the housing. A large conduit extends from the tank down through the housing to the reactor compartment. Thus if by some chance, a malfunction, manifested by thermal runaway should occur in the reactor, part or all of the contents of the tank can immediately be dumped into the reactor chamber to quench the reactor or at least prevent the build up of excessive heat within the chamber. Even though the reaction chamber is filled with water, assuming that the rest of the housing is still structurally sound, the remainder of the housing is sufficiently buoyant to float the entire platform and its contents.

The present plant can be completely assembled on shore or in a dry dock using conventional ship building techniques. Then it can be towed to the site and moored. As such, it can be located well away from population centers. Further, due to its "tuned" construction it will remain stable despite the most turbulent seas. Of course the plant is equipped with radar and lights to minimize the danger of collision. Also, if practicable, an underwater annular earthen wall or surface break water may be formed around the platform using dredge tailings or other conveniently available material. This will prevent the larger draft ships from colliding with the platform, while the platform itself is sturdy enough to withstand collision by smaller vessels which can pass over the wall.

When it is necessary to repair the nuclear reactor or replenish its fuel supply, the entire plant can be towed back to shore and be worked on with a minimum amount of effort and expense.

BRIEF DESCRIPTIONS OF THE DRAWINGS

For a fuller understanding of the nature and the objects of the invention reference should be had to the following detailed description taken in connection with the accompanying drawings in which:

FIG. 3 is a schematic representation illustrating one technique for mooring the plant;

FIG. 4 is a similar diagram showing another mooring technique, and

FIG. 5 is similar diagram showing still another means for mooring the power plant.

DESCRIPTION OF THE PREFERRED EMBODIMENTS

Figure 1:
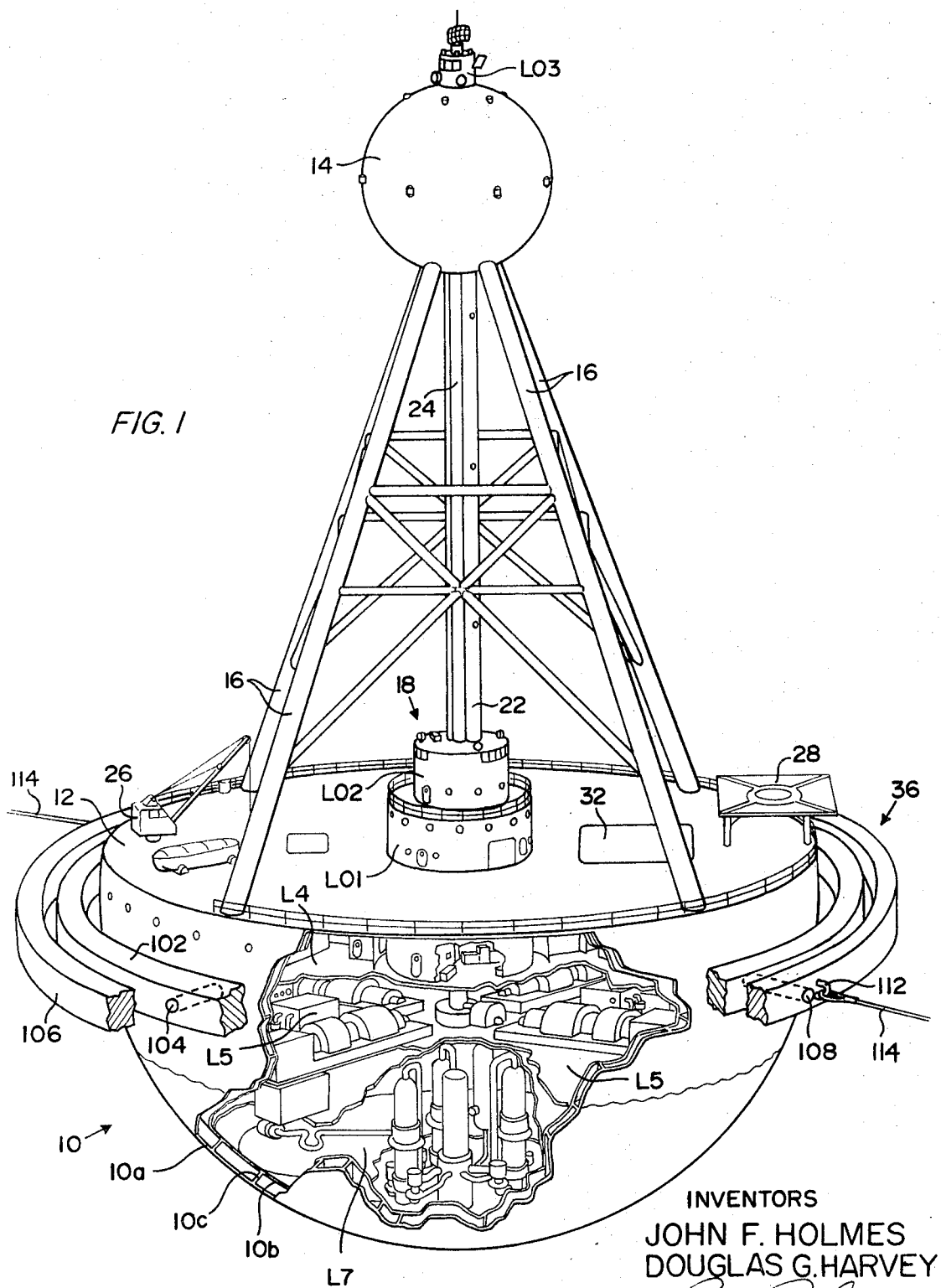
FIG. 1 illustrates the present invention as a floating nuclear power plant.

Referring to FIG. 1 of the drawings, the floating power plant comprises a generally spherical housing shown generally at 10 which contains the major components of the plant. Preferably, the spherical shape of the housing is modified to the extent of providing a flat open main deck 12 to facilitate loading and off-loading of supplies and equipment. A relatively large spherical tank 14 is supported directly above the housing 10 by means of suitably braced tubular legs 16 which extend from the underside of the tank down to the edge of the main deck 12.

To reduce the danger from collision, housing 10 has a double-walled hull 10a, 10b. In addition, to further localize damage due to penetration of the outer hull wall 10a, the space between the walls is compartmented by dividers 10c extending between walls 10a and 10b. The interior of housing 10 below deck 12 is divided by suitable decking into a number of levels L1 to L7 (FIG. 12). Also the plant includes superstructure 18 located on the center line of the housing which forms above-deck levels L01 and L02. These levels may contain necessary navigational, communications and control instrumentation. An additional above deck level L03 is situated atop tank 14. This level houses lookouts and radar equipment. Access to this space may be had by an elevator shaft 22 extending from the L6 level through tank 14.

A conduit 24 extends from the interior of tank 14 parallel to shaft 22 down to the L7 level. This conduit is arranged to conduct water from the tank to that compartment in the event of a reactor emergency.

As seen in FIG. 1, a crane 26 is mounted on deck 12 to facilitate loading and off-loading of equipment and supplies. Also there is a helipad 28 on deck 12 on the opposite side thereof from the crane to accommodate helicopters. An elevator 32 is included in deck 12 to carry these helicopters below deck for storage if need be.

The power plant must be moored at the selected site in such a way that the mooring does not impart a rotational moment to the housing 10 in response to horizontal forces exerted by waves or currents. A preferred mooring system employs a gimbal arrangement shown generally at 36 which will be described in more detail later in connection with FIG. 3.

Figure 2:
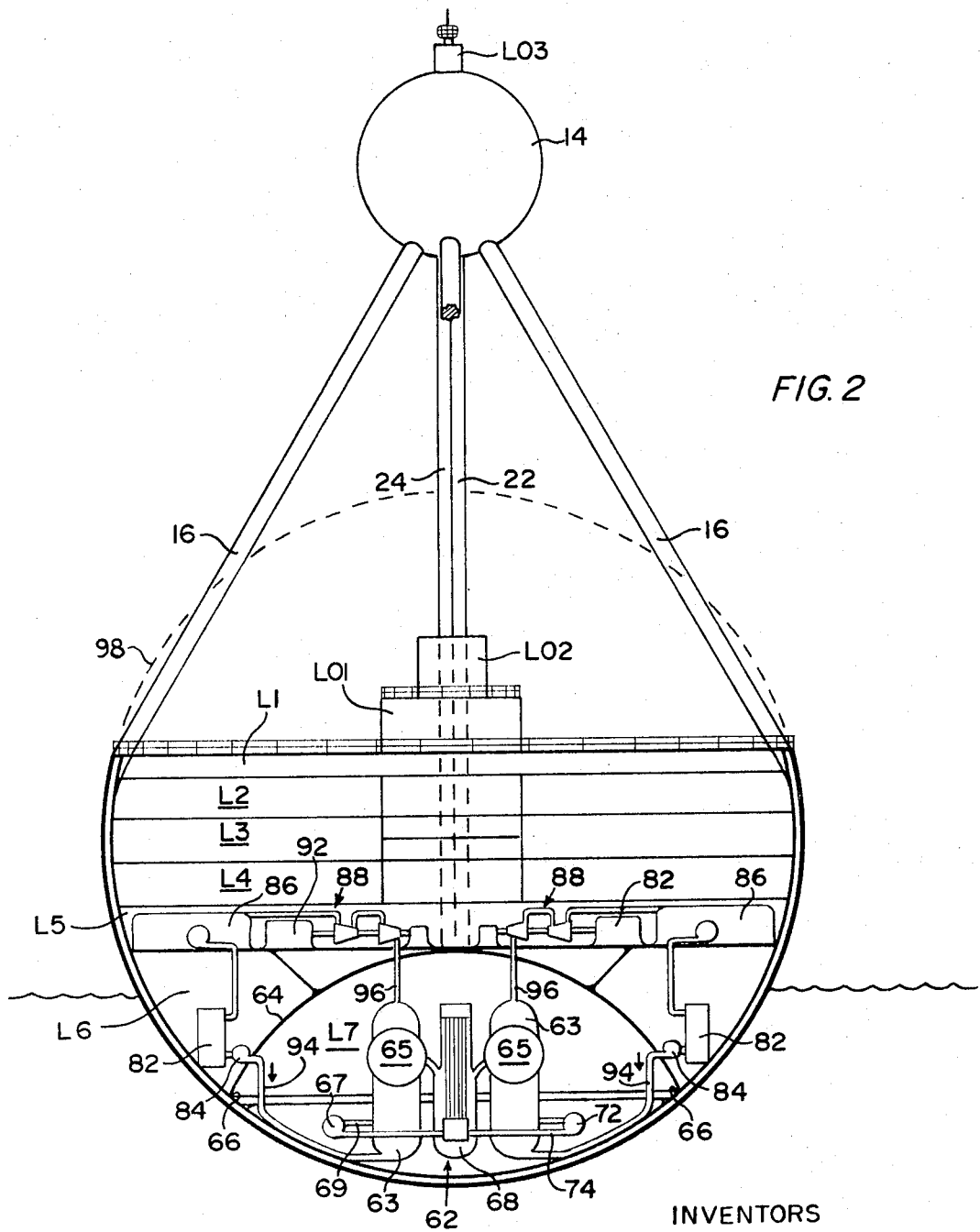
FIG. 2 is a schematic view in section showing the interior of the power plant.

Referring to FIGS. 1 and 2 of the drawings, the shielded reactor 62 constituting the single heaviest part of the power plant is located at the lowermost level L7 directly below the center of the housing 10. The steam generators 63 and pressurizers 65 are also located there. Pumps 67 pump the heat exchange fluid through conduits 69 connecting the reactor and steam generators. The level L7 containing the reactor is isolated from the rest of housing 10 by a domed overhead wall 64. This is consistent with conventional landbased reactor construction because this chamber configuration is best able to withstand pressure surges originating at level L7.

The circular joint 66 between the overhead wall 64 and the inner housing wall 10b is situated well below the static water line of the floating plant. Thus in the event that a ship collides with the plant, the impact occurs above the joint 66. Consequently, even if the ship penetrates both walls of housing 10, the damage and ensuing flooding should occur outside of the L7 level containing the reactor. The confined volume in level L7 is large enough so that even if the rest of the housing 10 is flooded the plant as a whole will still float. In other words, the volume of level L7 displaces an amount of water whose weight exceeds the entire weight of the floating power plant. Also the water in tank 14 can be dumped into the ocean so that the center of mass of the system remains below the metacenter and the system continues to float upright.

In the present system, plant personnel can dump all or part of the water from tank 14 through conduit 24 into level L7 to flood the reactor to prevent runaway or to extinguish a fire. Also the water can be circulated through the condensers for a short time in the event of pump failure until the reactor is cooled following insertion of moderating rods. Any suitable type of manually operated or remote controlled valve (not shown) may be installed in conduit 24 to control the flow of water through the conduit.

Still referring to FIG. 2, the heavy machinery and equipment associated with the power plant are distributed on the level directly above lowermost level L7. More particularly, level L6 contains feed water heaters 82 and pumps 84. While level L5 contains the condensers 86 and steam turbines 88 together with their associated electrical generators 92. In the present plant there are four separate generating systems driven by the single reactor 62.

There is a feeder-pump-condenser-turbine and generator combination associated with each of four steam generators 63 and these are arranged at right angles to one another about the vertical axis of the housing as shown in FIG. 1. Each pump 84 pumps water through a conduit 94 into the steam generator 63 and pressurizer 65 where the water is heated. The high energy steam issuing from the generator is conducted by a conduit 96 to the associated turbine 88 which drives a generator 92. The low energy steam is conducted from the turbine through the condenser 86 and thence to the feed water heater 82 before being recycled.

To minimize the pumping effort required, the intake pumps which circulate sea water through the condensers to cool them as well as the condensers themselves should be located below sea level. Alternatively, this equipment can be located above sea level as long as the water discharge conduit extends below the intake conduit. For best results, the plant should be located at a spot in the ocean having moving currents which will conduct the warm water discharge away from the plant.

The higher levels L3 and L4 contain the usual electrical equipment associated with a power plant of this type. Also they may have separate compartments for a hospital, a laboratory, a control center and the like. The storage and recreation facilities are contained at level L2, while the crew quarters and galley are located on level L1. Above deck levels L01 and L02 may contain navigational, control and radio facilities, as noted above. The uppermost level L03 may be reserved for lookout and radar systems. The important thing to note is that all of the fixed weight of the heavy items of machinery and equipment inside the power plant are distributed about the vertical axis of the plant so that the proper relationship between the center of gravity and the metacenter is maintained.

Also if it becomes necessary, the main deck 12 may be partially enclosed by an annular storm shield which conforms to the generally spherical shape of housing 10. Such a shield is shown in dotted lines at 98 in FIG. 2.

FIGS. 3-5 of the drawings illustrate various techniques for mooring the floating power plant without interfering with the stabilized characteristics. In FIG. 3, the plant is moored using a gimbal arrangement 36 also shown in FIG. 1. The gimbal comprises an inner ring 102 encircling housing 10 and pivotally mounted thereto by means of pivots 104 at opposite sides of the housing. A second, outer ring 106 encircles ring 102 and is pivotally connected to ring 102 by pivots 108 at opposite sides of the housing. The axes of the sets of pivots 104 and 108 are arranged perpendicular to one another. Eyes 112 are formed in the outer ring 106. In the illustration there are four such eyes spaced 90° around ring 106. Mooring lines 114 extend from these eyes to anchor pins 116 buried in the ocean floor outboard of the power plant. This mooring arrangement holds the power plant in a fixed position so that a minimum amount of strain is applied to the underwater power cable 118 leading from the power plant to shore. Furthermore, even though wave action transmitted through mooring lines 114 causes ring 106 to cock in one direction or another, this motion is not transferred to the housing 10 imparting roll action.

FIG. 4 illustrates a bridle arrangement for mooring the power plant. In this arrangement there are four trunnions 122 mounted on the side wall of housing 10, 90° apart. A pair of lines 124 extend in opposite directions from each trunnion 122 and lines 124 at opposite sides of housing 10 are joined together at 126 where they connect with a mooring line 128 anchored to the ocean floor. In a typical system there are four mooring lines 128 arranged 90° apart around the housing which hold the power plant securely in place. Though the lines 124 and 128 may be moved by motion of the water, the motion does not cause the housing 10 to roll or pitch. The FIG. 4 system is somewhat more reliable and easier to repair and replace than the gimbal.

FIG. 5 shows still another system for holding the power plant in place. In this arrangement, lines 132 are connected at opposite ends to eyes 134 and 136 in the housing. The eyes 134 are located above the water line while the eyes 136 are situated near the bottom of the housing. Typically there are four sets of eyes distributed around the outside of the housing. Each line 132 passes over a pulley 138 situated just above eye 134 and the line is connected near its midpoint 142 to a mooring line 144 anchored in the ocean floor. Here again the power plant is substantially unaffected by movement of the mooring lines due to wave action. This sytem has an advantage in that the point of reaction can be moved up or down by the use of winches on the main deck of housing 10. Consequently, the tilt of the floating power plant due to steady-state wind drag may be compensated for by adjusting the lines of drag.

In all of these mooring arrangements the mooring lines should be as long as possible to minimize stress on these lines. Conventional techniques may be used to anchor the lines to the ocean bottom. For example, a hole about 30 feet deep may be drilled and filled with concrete with a suitable eye provided to which the mooring line can be connected.

It will be seen from the foregoing then that the floating power plant provides an answer to the demand for increased electrical power requirements. The plant can be located far away from population centers. Furthermore, it is surrounded by an inexhaustible supply of cooling water so that there is no problem of thermal pollution. Moreover, due to the physical characteristics of the floating platform in which the plant is contained, the plant machinery and equipment are not subjected to bending or twisting forces that might normally be expected in a compliant platform nor to roll and its consequent interaction with rotating machinery due to wave motion. Finally, the subject plant is readily accessible to operating and maintenance personnel. Moreover it can be constructed and repaired relatively easily because this can be done on-shore or in dry dock.

It will thus be seen that the objects set forth above among those made apparent from the preceding description are efficiently attained and since certain changes may be made in the above construction without departing from the scope of the invention it is intended that all matter contained in the above description or shown in the accompanying drawings should be interpreted as illustrative and not in a limiting sense.

It is also to be understood that the following claims are intended to cover all of the generic and specific features of the invention herein described.

What is claimed is:

1. A floating power plant comprising,
   A. a generally spherical housing including a fluid tight compartment located at the bottom thereof,
   B. electrical generating equipment located in the housing, the weight distribution of the housing and its contents being arranged so that the housing floats in an upright position and has a natural frequency of oscillation which is substantially below that of the wave frequency of the water in which the plant floats,
   C. a relatively large tank suitable for holding water,
   D. means extending between the tank and the housing for supporting the tank above the housing on the center line thereof,
   E. a conduit extending between the tank and the fluid tight compartment, and
   F. valve means in the conduit for controlling the flow of water from the tank to the fluid tight compartment.

2. The power plant defined in claim 1 wherein the electrical generating equipment includes a nuclear reactor situated near the bottom of the housing directly below the geometrical center thereof.

3. The power plant defined in claim 2 wherein said nuclear reactor is contained in said fluid-tight compartment, said compartment being separated from the remainder of the housing by a dome-shaped overhead wall.

4. The power plant defined in claim 3 wherein the overhead wall has a circular joint with the housing wall which is situated well below the static waterline of the floating power plant.

5. The power plant defined in claim 1 wherein the portion of the housing in contact with the water has a double wall and the space between the walls is compartmented.

6. The power plant defined in claim 5 wherein the spherical shape of the housing is modified to provide a generally flat main deck area above the static water line of the plant.

7. A floating power plant comprising
   A. a generally spherical housing,
   B. a fluid tight compartment located at the bottom of the housing and having an overhead wall,
   C. a nuclear reactor contained in the fluid tight compartment on the center line of the housing,
   D. electrical generating and control equipment located within the housing above the fluid tight compartment,
   E. a container for holding water,
   F. means connected between the housing and the container for supporting the container an appreciable distance above the housing, the fixed weight of the housing, reactor, equipment and filled container being distributed so that the center of mass of the entire system is appreciably below the geometric center of the housing so that the power plant tends to float in an upright position,
   G. a conduit extending between the water container and the fluid tight compartment, and
   H. valve means in the conduit for controlling the flow of water from the container to the compartment.

8. The floating power plant defined in claim 7 wherein the overhead wall of the fluid tight compartment is domed-shaped so that it can withstand sudden pressure increases originating inside the compartment.

9. The floating power plant defined in claim 8 wherein the overhead wall of the compartment engages the housing along a circular joint below the static water level of the floating power plant so that in the event of collision by a ship, penetration of the power plant tends to occur at a point above the joint so that the fluid tight compartment is not flooded.

10. The floating power plant defined in claim 7 wherein the portion of the housing wall immersed in water has a double wall and intervening compartmented spaces.

11. The floating power plant defined in claim 7 wherein the spherical shape of the housing is modified to the extent of providing a relatively flat main deck area.

12. The floating power plant defined in claim 7 and further including
A. an elevated compartment situated atop the container for housing operating personnel and
B. means for obtaining access to the elevated compartment from the housing.

13. A floating power plant comprising,
A. a generally spherical housing,
B. electrical generating equipment located in the housing, the weight distribution of the housing and its contents being arranged so that the housing floats in an upright position and has a natural frequency of oscillation which is substantially below that of the wave frequency of the water in which the plant floats,
C. means for mooring the power plant to the ocean floor, the forces of said mooring lines directed through the metacenter of the sphere thereby not creating force couples which cause the platform to roll or pitch, said mooring means comprising a plurality of mooring sets, each set including:
a. a mooring line,
b. means for attaching the opposite ends of the mooring line to upper and lower locations on the outside of the housing,
c. means for securing the bight of the mooring line to the ocean floor, and
d. a pulley positioned above the upper securing means over which the upper reach of the mooring line passes.

* * * * *